United States Patent
Huxham

(10) Patent No.: US 10,621,316 B2
(45) Date of Patent: Apr. 14, 2020

(54) METHOD AND SYSTEM FOR ASSOCIATING A USER WITH A WEARABLE DEVICE

(71) Applicant: Visa International Service Association, San Francisco, CA (US)

(72) Inventor: Horatio Huxham, Cape Town (ZA)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 15/544,868

(22) PCT Filed: Apr. 7, 2016

(86) PCT No.: PCT/IB2016/051980
§ 371 (c)(1),
(2) Date: Jul. 19, 2017

(87) PCT Pub. No.: WO2016/162823
PCT Pub. Date: Oct. 13, 2016

(65) Prior Publication Data
US 2018/0004926 A1    Jan. 4, 2018

(30) Foreign Application Priority Data

Apr. 8, 2015  (ZA) .................................. 2015/02325

(51) Int. Cl.
*G06F 21/00*  (2013.01)
*G06F 21/32*  (2013.01)
(Continued)

(52) U.S. Cl.
CPC ............. *G06F 21/32* (2013.01); *G06F 1/163* (2013.01); *G06F 1/1684* (2013.01); *G06F 21/35* (2013.01);
(Continued)

(58) Field of Classification Search
CPC . G06F 1/16; G06F 1/163; G06F 21/32; G06F 21/6245; G06F 21/40; G06F 21/62;
(Continued)

(56) References Cited

U.S. PATENT DOCUMENTS

2007/0155366 A1* 7/2007 Manohar ............. H04M 1/2535
                                                     455/411
2007/0293781 A1* 12/2007 Sims .................... A61B 5/1135
                                                     600/534
(Continued)

FOREIGN PATENT DOCUMENTS

KR    10 2014-0098837    8/2014
WO       2014021602 A2   2/2014

OTHER PUBLICATIONS

NPL Search Results (Year: 2019).*
(Continued)

*Primary Examiner* — Syed A Zaidi
(74) *Attorney, Agent, or Firm* — Kilpatrick Townsend & Stockton LLP

(57) ABSTRACT

A method and system are provided for associating a user with a wearable device. The method includes: obtaining physiological information of a user of a wearable device; comparing the obtained physiological information against a stored physiological profile, wherein the stored physiological profile is built up over time from obtained physiological information; and, based on the comparison, updating a confidence parameter indicating the extent to which the obtained physiological information matches the physiological profile.

12 Claims, 12 Drawing Sheets

(51) Int. Cl.
- *G06F 21/35* (2013.01)
- *G06F 1/16* (2006.01)
- *H04L 9/32* (2006.01)
- *G06F 21/40* (2013.01)
- *G06F 21/62* (2013.01)

(52) U.S. Cl.
CPC .............. *G06F 21/40* (2013.01); *G06F 21/62* (2013.01); *G06F 21/6245* (2013.01); *H04L 9/3231* (2013.01); *H04L 2209/805* (2013.01)

(58) Field of Classification Search
CPC ..... G06F 21/316; G06F 21/31; H04L 9/3231; H04L 2209/805
USPC .......................................................... 726/19
See application file for complete search history.

(56) References Cited

U.S. PATENT DOCUMENTS

| | | | |
|---|---|---|---|
| 2011/0018682 A1* | 1/2011 | Weisfeld | A63B 24/0059 340/5.7 |
| 2013/0182913 A1 | 7/2013 | Hoyos et al. | |
| 2014/0085050 A1 | 3/2014 | Luna | |
| 2014/0089672 A1 | 3/2014 | Luna et al. | |
| 2014/0279528 A1 | 9/2014 | Slaby et al. | |
| 2014/0282868 A1* | 9/2014 | Sheller | G06F 21/31 726/3 |
| 2014/0341441 A1 | 11/2014 | Slaby et al. | |
| 2014/0366111 A1* | 12/2014 | Sheller | H04L 63/08 726/7 |
| 2015/0028996 A1 | 1/2015 | Agrafioti | |
| 2015/0035643 A1 | 2/2015 | Kursun | |
| 2015/0156196 A1 | 6/2015 | Kim et al. | |
| 2015/0156744 A1* | 6/2015 | Haro | H04W 4/021 455/456.1 |
| 2016/0135046 A1* | 5/2016 | John Archibald | H04W 12/06 455/411 |
| 2016/0164865 A1* | 6/2016 | Speicher | H04L 63/0861 726/4 |

OTHER PUBLICATIONS

Supplementary European Search Report, dated Mar. 1, 2018, in EP Application No. 16776209.5, 7 pages.

International Search Report and Written Opinion, dated Aug. 2, 2016, in PCT Application No. PCT/IB2016/051980, 13 pages.

RU2017134645 , "Office Action", dated Sep. 17, 2019, 12 pages.

* cited by examiner

METHOD AND SYSTEM FOR ASSOCIATING A USER WITH A WEARABLE DEVICE

CROSS REFERENCE TO RELATED APPLICATIONS

This application is a National Stage of International Application No. PCT/IB2016/051980 filed Apr. 7, 2016, and which claims priority to South African provisional patent application number 2015/02325 filed on Apr. 8, 2015, which are all herein incorporated by reference.

FIELD OF THE INVENTION

This invention relates to a method and system for identifying a user, and more particularly to a method and system of identifying a user by associating the user to a wearable device.

BACKGROUND TO THE INVENTION

Improvements in technology has led to the development of smart wearable devices in the form of clothing and accessories such as smart watches, activity tracker wristbands, smart shirts, smart glasses and smart gloves, to name but a few examples. These devices may be always on and accessible. Some forms of wearable devices are stand-alone devices which may have independent communication and functionality. Other wearable devices may require a linked communication device such as a smart phone with which to communicate via a wireless communication channel, such as Bluetooth®, Wi-Fi®, or Near Field Communication (NFC).

Wearable devices may permit users to perform various functions. For example, a user may check his/her emails using the device or even perform a financial transaction.

A problem exist if a wearable device is lost or stolen and someone other than the owner of the device accesses the owner's personal information or uses the wearable device to conduct a fraudulent transaction. For example, an unauthorised person may use a wearable device to access the owner's emails, personal information or perform a financial transaction.

Similarly, a transaction may be carried out by a communication device such as a smart phone and a problem exists if the smart phone is stolen and is no longer in the possession of an authorised user.

A need exists to ensure that a wearable device is attached to an authorised user of the device and not a fraudster or an unauthorised user.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a computer implemented method for associating a user with a wearable device, the method comprising:
  obtaining physiological information of a user of a wearable device;
  comparing the obtained physiological information against a stored physiological profile, wherein the stored physiological profile is built up over time from obtained physiological information; and,
  based on the comparison, updating a confidence parameter indicating the extent to which the obtained physiological information matches the physiological profile.

Further features provides for the physiological profile to be based on one or more measurable physiological parameters, which are obtainable on a periodic or continuous basis and used to build the user's physiological profile.

Further features provide for the computer implemented method to include the steps of:
  obtaining physiological information of a user which includes obtaining physiological information whilst the user is carrying out an activity; and
  comparing the obtained physiological information against a stored physiological profile for the given activity.

Further features provide for the computer implemented method to include obtaining activity information and/or environmental information at the time of obtaining physiological information, and wherein the physiological profile is referenced with one or more activity parameters and/or one or more environmental parameters from the obtained activity information and/or environmental information.

Further features provide for the computer implemented method to be carried out at the time of a transaction request of a user of the wearable device.

Yet further features provide for the computer implemented method to include the step of: in the event that the confidence parameter is below a first threshold, obtaining additional user credentials for authorisation to carry out a transaction.

Yet further features provide for the computer implemented method to include the step of: in the event that the confidence parameter is below a second threshold, declining a transaction.

Further features of the computer implemented method provide for the additional user credentials to include, obtaining physiological information whilst the user is carrying out an instructed activity.

Further features of the computer implemented method provide for obtaining additional user credentials to include retrieving physiological information obtained prior to a request to carry out a transaction and comparing the retrieved physiological information against a stored physiological profile for an instructed activity.

Further features provide for the computer implemented method to include monitoring the movement of the wearable device during the activity to ensure the activity is carried out.

Yet further features provide for the computer implemented method to include the step of: in the event that the confidence parameter is below a third threshold, blocking operation of the wearable device.

Further features provide for the computer implemented method to be carried out at the wearable device.

Further features provide for the computer implemented method to be carried out at a smart phone in communication with a wearable device.

Further features provide for the computer implemented method to be carried out at a remote server.

Further features provide for obtaining physiological information of a user of a wearable device by obtaining physiological information from two or more wearable devices of the user.

The invention extends to a system for associating a user with a wearable device, the system including a memory for storing computer-readable program code and a processor for executing the computer-readable program code, the system comprising:

a physiological information obtaining module for obtaining physiological information of a user of a wearable device;

a comparing module for comparing the obtained physiological information against a stored physiological profile, wherein the stored physiological profile is built up over time from obtained physiological information; and, a confidence parameter adjustment module for updating a confidence parameter based on the comparison indicating the extent to which the obtained physiological information matches the physiological profile.

Further features provide for the system whereby, the physiological information obtaining module is for obtaining physiological information of a user whilst the user is carrying out an activity; and whereby the comparing module is for comparing the obtained physiological information against a stored physiological profile for the given activity.

Yet further features provide for the system to include an additional user credential module for obtaining additional user credentials if the confidence parameter is below a threshold before providing authorisation to carry out a transaction.

Further features of the system provide for the additional user credential module to include obtaining physiological information whilst the user is carrying out an instructed activity.

Further features of the system provide for the additional user credential module to include retrieving physiological information obtained prior to a request to carry out a transaction and whereby the comparing module is for comparing the retrieved physiological information against a stored physiological profile for an activity.

Further features provide for the system to be a wearable device and the physiological information obtaining module to include one or more sensors for measuring one or more measurable physiological parameters on a periodic or continuous basis or in response to an instructed activity.

Further features provide for the system to include a movement sensor for monitoring the movement of the wearable device during the activity to ensure the activity is carried out.

Further features provide for the system to include an environmental sensor for monitoring environmental parameters at the wearable device.

Further features provide for the system to be a smart phone and the physiological information obtaining module receives the physiological information from a wearable device.

Further features provide for the system to be a smart phone and the physiological information obtaining module receives the physiological information from two or more wearable devices.

Further features provide for the system to be a remote server and the physiological information obtaining module receives the physiological information from a wearable device.

Further features provide for the system to be a remote server and the physiological information obtaining module receives the physiological information from two or more wearable devices.

The invention extends to a computer program product for associating a user with a wearable device, the computer program product comprising a computer-readable medium having stored computer-readable program code for performing the steps of:

obtaining physiological information of a user of a wearable device;

comparing the obtained physiological information against a stored physiological profile, wherein the stored physiological profile is built up over time from obtained physiological information; and, based on the comparison, updating a confidence parameter indicating the extent to which the obtained physiological information matches the physiological profile.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1A:
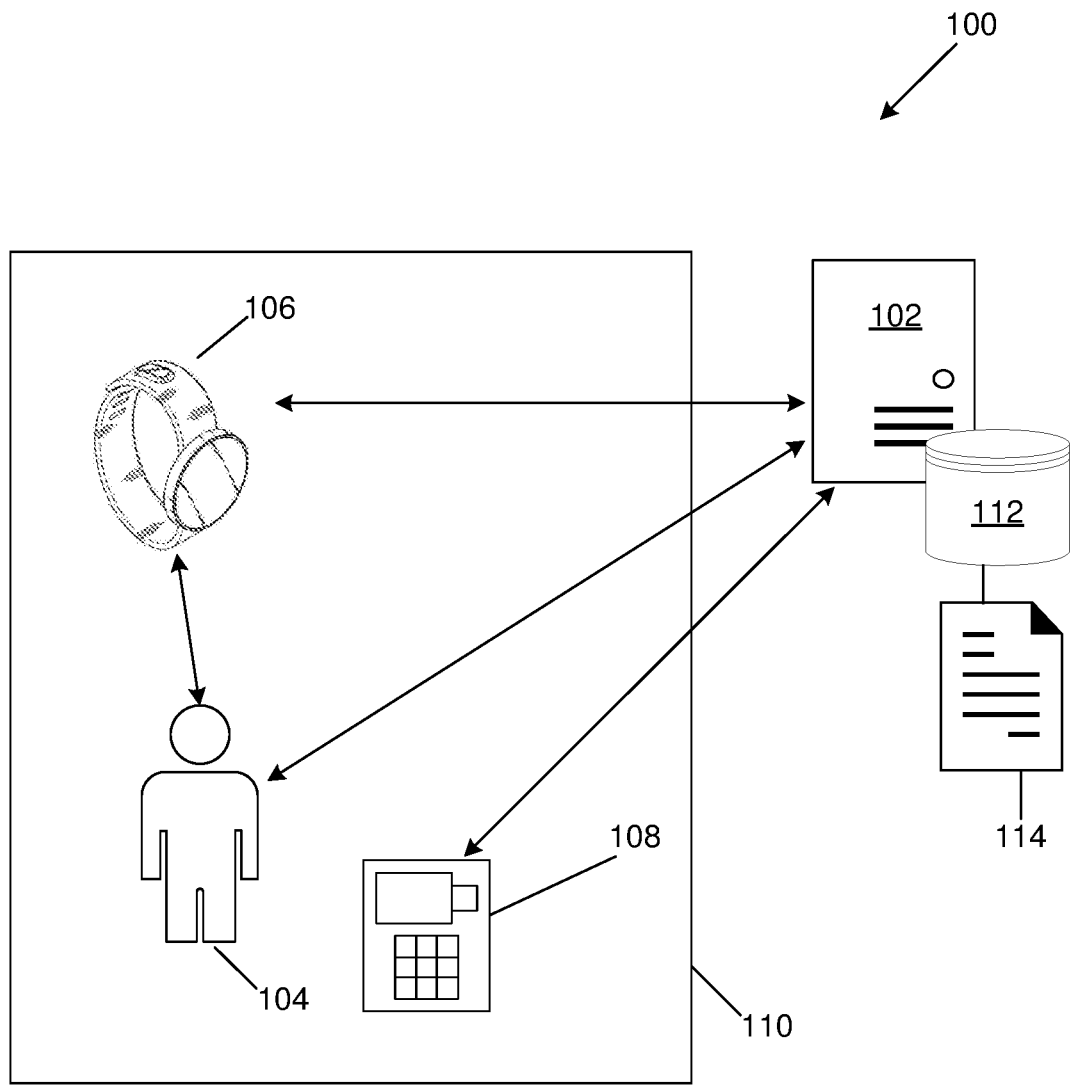
FIG. 1A illustrates a system for associating a user with a wearable device according to an embodiment of the invention.

Embodiments described herein provide a method and system for associating a user with a wearable device using the user's physiological information. Further embodiments describe a method of identifying a user performing a transaction using the user's possession, in this case the wearable device. Transactions may include transactions of a financial nature, such as payment transactions (card-present and card-not-present transactions), as well as any other form of transaction in which a user is required to provide user credentials to authorise the transaction, such as accessing a social media profile or an account registered with an online service provider.

Embodiments of the method and system described may be used to detect possible fraud in a transaction by identifying if it is in fact the rightful user performing the transaction and not a fraudster. If a user wishes to perform a transaction, a request to identify the user is made at which time the physiological information of the user is obtained by the wearable device and compared against a stored physiological profile. Based on the comparison, a confidence parameter is assigned indicating the extent to which the obtained physiological information matches the physiological profile. This identifies if the wearable device is in fact attached to the rightful user performing the transaction. These and other aspects will become apparent from the exemplary embodiments described below.

FIGS. 1A to 1E illustrates exemplary embodiments of a system (100) for associating a user with a wearable device. The system (100) may include a computing device (102) and a user (104) in possession of one or more wearable devices (106, 107). The computing device (102) may be provided to supplement the processing capabilities of the one or more wearable devices (106, 107). In some embodiments, the wearable device (106) may have sufficient processing capability to carry out all or at least some of the described functions within the wearable device (106) without need to communicate with the computing device (102).

In one embodiment as illustrated in FIG. 1A, the system (100) includes a user (104) in possession of one wearable device (106), namely a smart watch, which is associated with the user and capable of communicating with the computing device (102) over a suitable communication channel. It should be noted that any form of wearable device which could be associated with the user and having communication capabilities may be used, including for example a smart glove, smart shirt, a wristband or smart glasses. Further it should be noted that any computing device with processing capabilities and communicating means could be used, for example a smart phone, a tablet, a personal digital assistant, a phablet, a laptop computer, a desktop computer, or a server.

Figure 1B:
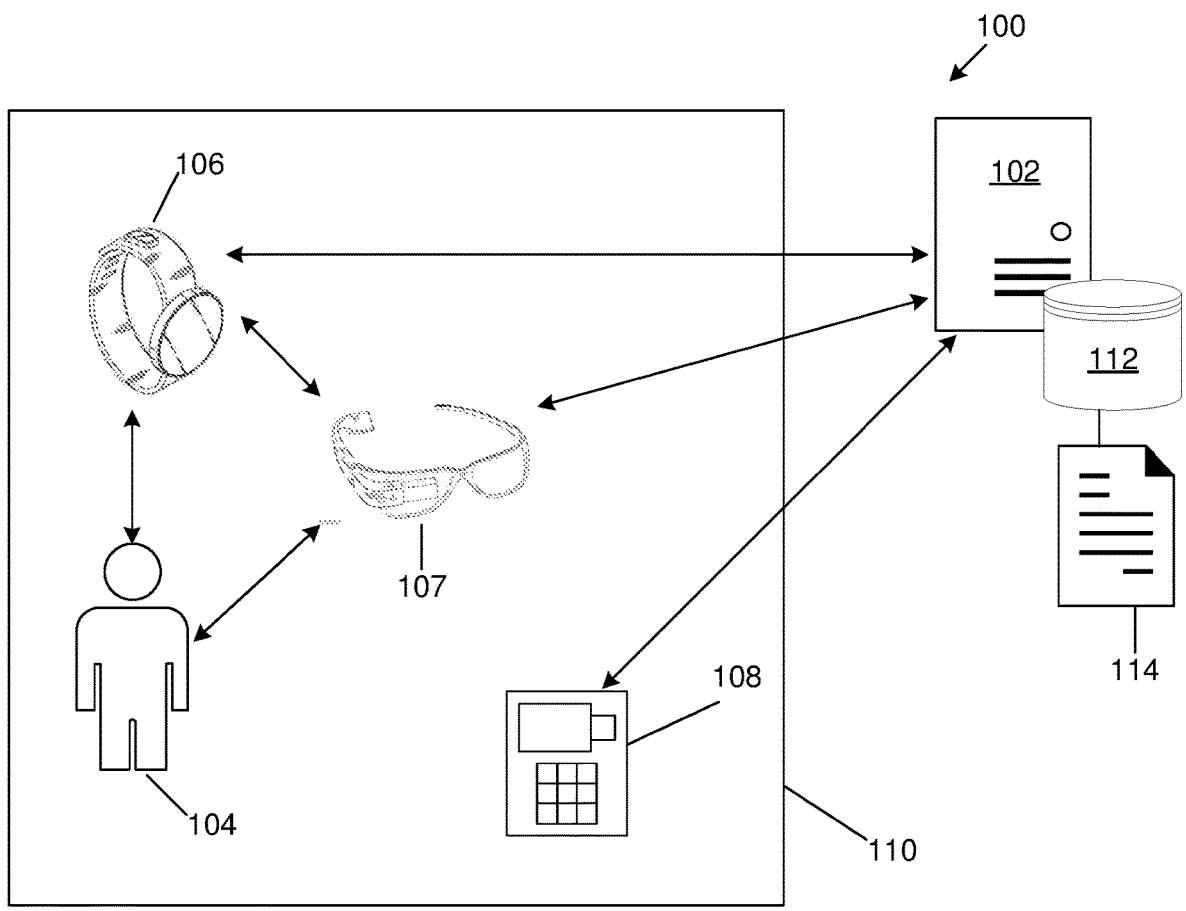
FIG. 1B illustrates a system for associating a user with two or more wearable devices in communication with each other according to an embodiment of the invention.
Figure 1C:
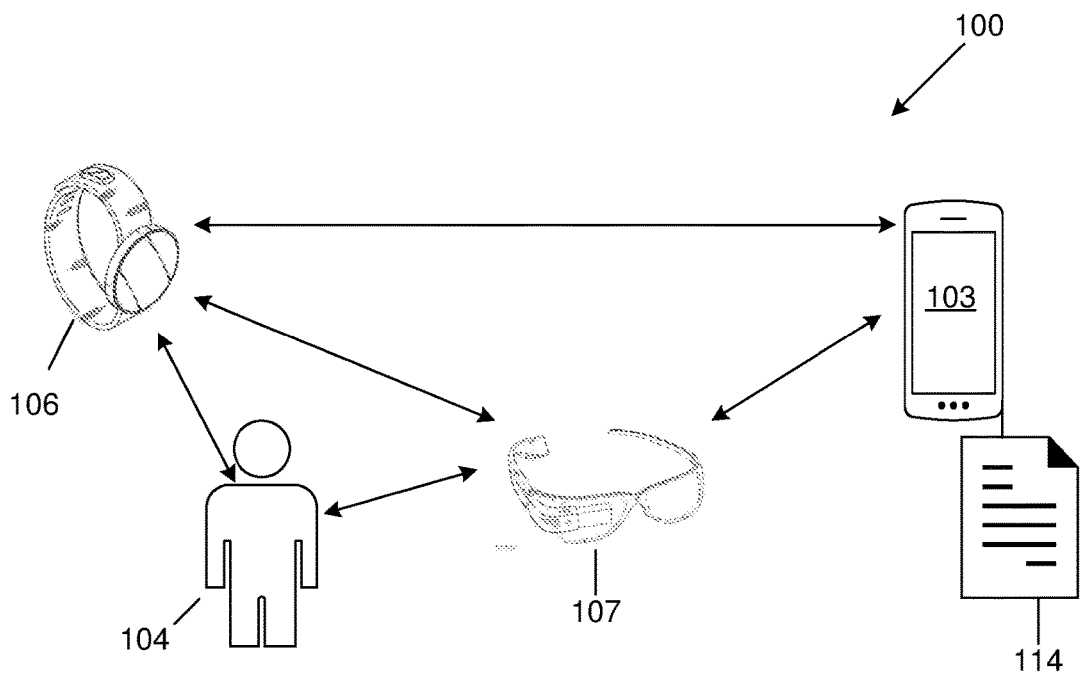
FIG. 1C illustrates a system for associating a user with two or more wearable devices in communication with each other and a smart phone according to an embodiment of the invention.

In one embodiment, as illustrated in FIG. 1B, the system (100) includes a user (104) in possession of two or more wearable devices (106, 107) which are associated with the user. The wearable devices (106, 107) may be capable of communication with each other and with a computing device (102) over a suitable communication channel. It is appreciated that one or all the wearable devices may be used to gather and verify physiological information, and in instances where one wearable device is damaged, compromised, or has a time lag, another wearable device may be used to gather and verify physiological information. It is further appreciated that all the wearable devices may be acting in unison and may be used to gather and verify physiological information in accordance with this embodiment.

In one embodiment, as illustrated in FIG. 10, the system (100) includes a user (104) in possession of one or more wearable devices (106, 107) which are associated with the user. The wearable devices (106, 107) may be capable of communication with each other and with a smart phone (103). The one or more wearable devices (106, 107) may gather and verify physiological information which may be used to access the smart phone (103) or perform a transaction on the smart phone (103) such as accessing a social media profile or an account registered with an online service provider.

Figure 1D:
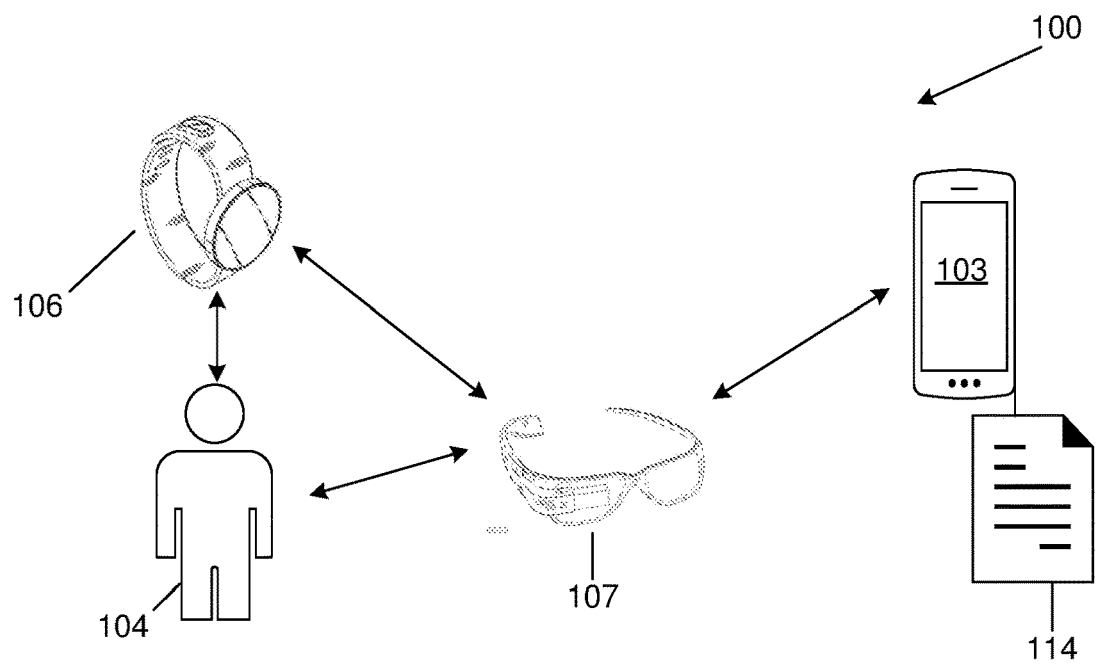
FIG. 1D illustrates a system for associating a user with two or more wearable devices, one of which is in communication with a smart phone according to an embodiment of the invention.

In one embodiment, as illustrated in FIG. 1D, the system (100) includes a user (104) in possession of one or more wearable devices (106, 107) which are associated with the user. The wearable devices (106, 107) may be capable of communication with each other, and capable of gathering and verifying physiological information, but only one wearable device (107) may be capable of communicating with a smart phone (103).

Figure 1E:
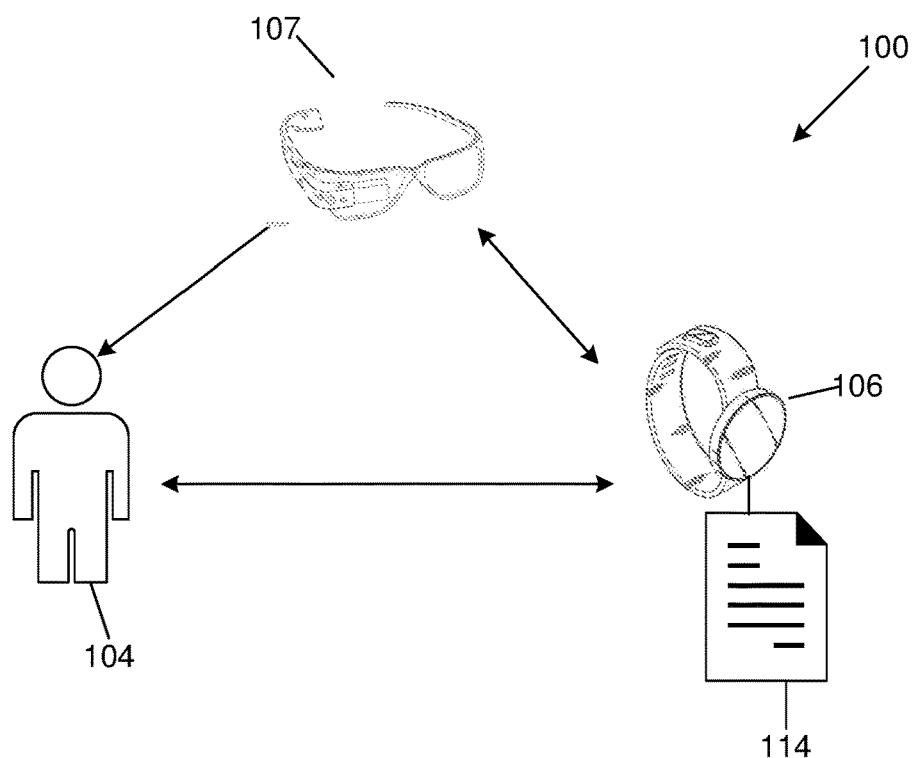
FIG. 1E illustrates a system for associating a user with a stand-alone wearable device which may or may not be in communication with another wearable device according to an embodiment of the invention.

In one embodiment, as illustrated in FIG. 1E, the system (100) includes a user (104) in possession of a wearable device (106), which is associated with the user. The wearable device (106) may be in communication with another wearable device (107), but it is a stand-alone device with a processor and an operating system, and all the functionality may take place on the device (106).

Communication between the wearable devices (106, 107) and the computing device (102) may take place over any suitable communication channel, including a local wireless network, third generation (3G), fourth generation (4G), fifth generation (5G), high-speed downlink packet access (HSDPA), general packet radio service (GPRS), short message service (SMS), and unstructured supplementary service data (USSD) communication protocols to name but a few examples. In a preferred embodiment, the wearable devices (106, 107) are capable of directly communicating with the computing device (102), however, it is envisaged that this will not always be possible and in such cases the devices will be enabled to communicate with the computing device (102) utilizing a local wireless network or utilizing the communication capabilities of another communication device, such as a mobile phone or the like. It is appreciated that wearable devices may lack extensive communication capabilities and therefore may require linking to another device such as a smart phone. In embodiments where a smart phone is provided to supplement the processing capabilities of one or more wearable devices, the communication between the one or more wearable devices and the smart phone may take place using close proximity or short range communication such as near field communications (NFC), Bluetooth® or infra-red medium as well as Wi-Fi® technology.

In the embodiments illustrated in FIGS. 1A and 1B, the system may further include a point of sale (POS) device (108) in a retail store of a merchant (110). It is appreciated that a POS device may be required if the user wishes to perform a transaction. The POS device (108) may take the form of a merchant's computing device with POS functionality.

The system may also include a store of physiological information gathered from the one or more wearable devices (106, 107). The physiological information may be stored in a database (112) which may be associated with the computing device (102) or associated with or stored at the one or more wearable devices (106, 107). In one embodiment, the physiological information may be stored in cloud storage associated with the wearable devices (106, 107) or computing device (102). The physiological information may include any form or combination of physiological data gathered by the one or more wearable devices (106, 107), such as heart rate/pulse pattern, sweat pattern, gait or any measurable physiological parameter. The physiological information may be converted into a physiological profile (114) for the user.

Figure 2A:
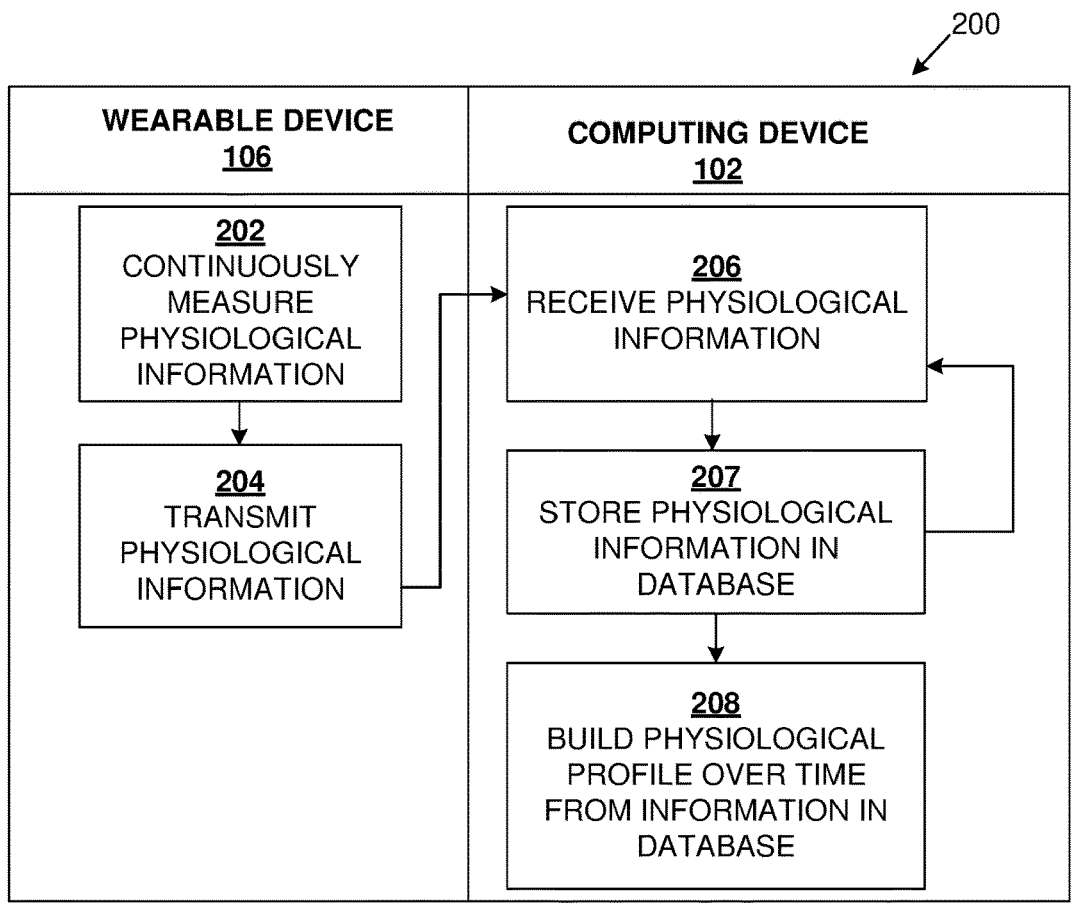
FIG. 2A is a flow diagram for illustrating a method of building a user's physiological profile according to an embodiment of the invention.
Figure 2B:
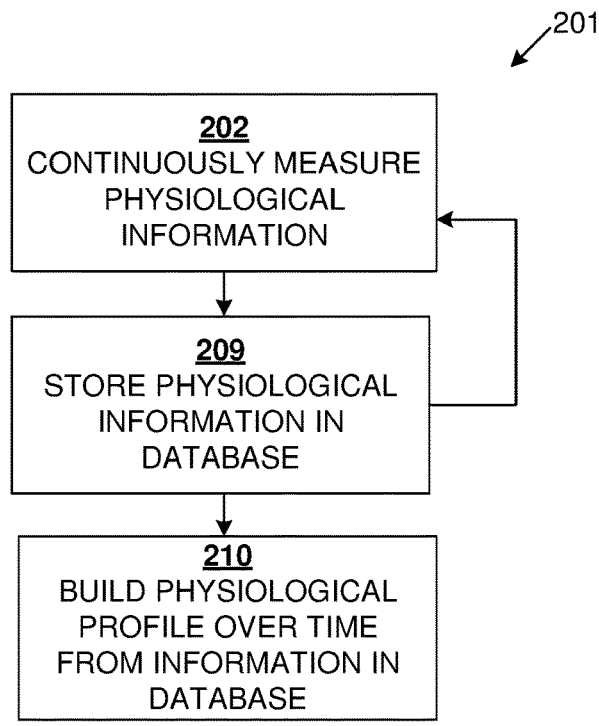
FIG. 2B is a flow diagram for illustrating a method of building a user's physiological profile according to an alternative embodiment of the invention.
Figure 2C:
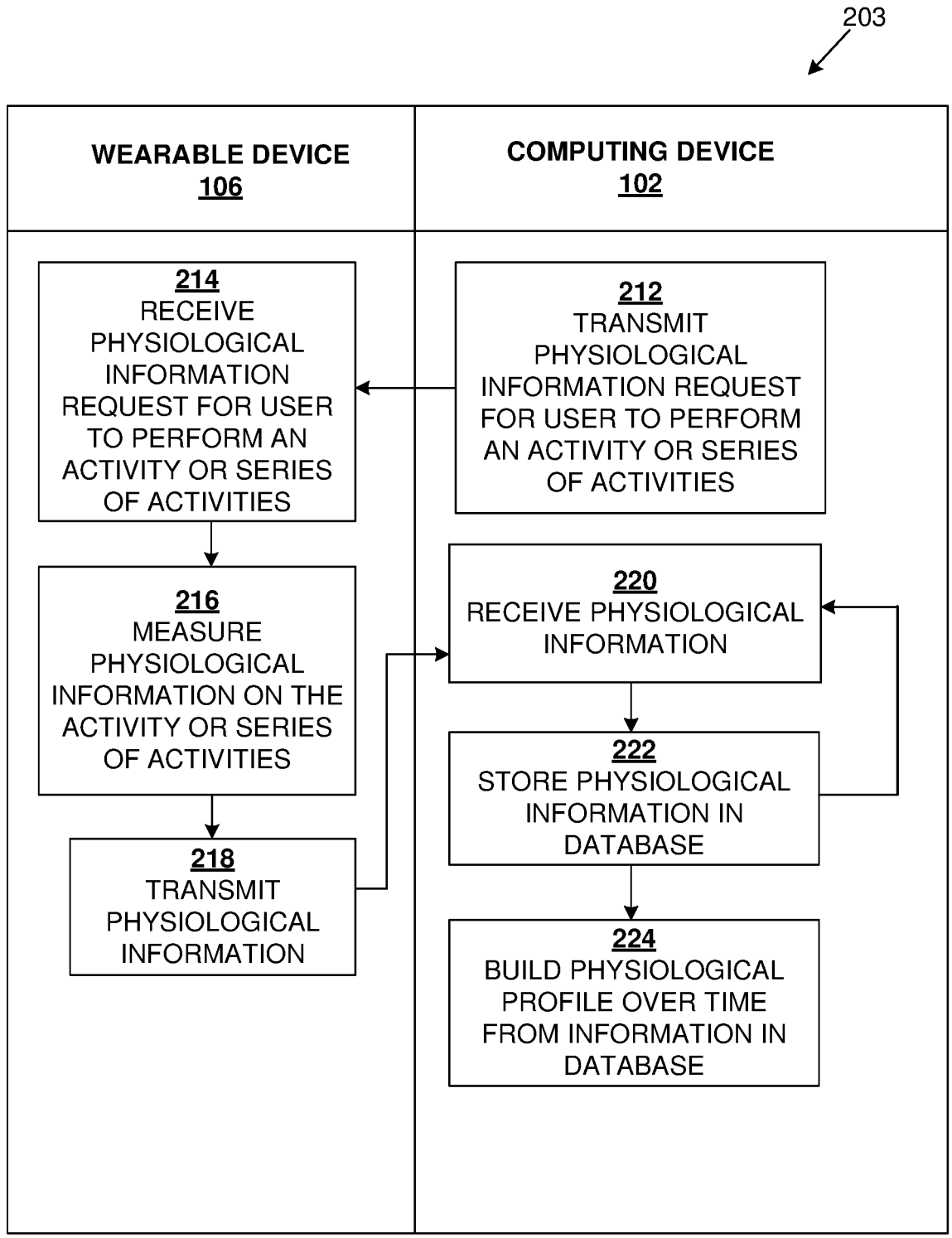
FIG. 2C is a flow diagram for illustrating a method of building a user's physiological profile according to another alternative embodiment of the invention.

The physiological profile (114) of FIGS. 1A to 1E may be built according to the methods (200, 201 and 203) described and illustrated in the embodiments of the flow diagrams of FIGS. 2A, 2B and 2C.

FIG. 2A illustrates an embodiment of a method (200) of generating a user's physiological profile over time using continuous or periodic physiological measurements of the user. At a first step (202), the wearable device (106) measures the user's physiological information over time and transmits (204) the physiological information via a suitable communication channel to the computing device (102). As mentioned in the description above, any computing device with processing capabilities and communicating means could be used for example a smart phone, a tablet, a personal digital assistant, a phablet, a laptop computer, a desktop computer or a server. It is noted that the wearable device may continuously measure the user's physiological information or may measure the user's physiological information at periodic intervals, for example, it may measure the user's physiological information every 15 minutes from sunrise to sunset which is assumed to be the period the user is most active. Alternatively, the wearable device may measure the user's physiological information at specific times of the day which may be set by the user or manufacturer of the wearable device, for example, at 8 a.m., noon and 6 p.m. As a further alternative, the wearable device may measure the user's physiological information during pre-defined types of activities.

The physiological information may be measured in conjunction with activity parameters and/or environmental parameters which may also be measured by the wearable device. For example, a user may be walking in a hot temperature day, GPS and/or accelerometer measurements may provide activity parameters and a thermometer or weather information resource may provide environmental parameters.

At a next step (206), the computing device (102) receives the physiological information and stores (207) the physiological information in a database (112) and at a next step, the computing device (102) builds the user's physiological profile (114) using the stored information in the database (112). The physiological profile (114) may be updated as the computing device (102) receives new physiological information from the wearable device (106). The physiological profile (114) may be a statistically generated profile of the one or more measured physiological parameters, optionally in conjunction with measured activity parameters and/or environmental parameters. For example, if the measured physiological profile is the body temperature, the physiological profile may be the average body temperature as a function of time, the highest or lowest body temperature recorded over a specific time period, the difference between the highest and the lowest body temperatures over a specific time period, the body temperature for a corresponding ambient temperature, or a combination of any of the above.

FIG. 2B illustrates an alternative embodiment of a method (201) of generating a user's physiological profile. In this embodiment, the wearable device (106) measures (202) the user's physiological information over time and stores (209) the physiological information in a built-in database or using associated storage such as cloud storage. As mentioned in the description above, the wearable device may continuously measure the user's physiological information or may measure the user's physiological information at periodic intervals, at specific times of the day, or during particular activities which may be set by the user or manufacturer. The physiological profile, at a next step (210), is built from the data in the database and may be continuously or periodically updated as new physiological information is obtained. In embodiments where the user possesses two or more wearable devices, each wearable device may measure and store the user's physiological information in databases which may be used to build the user's physiological profile. It is appreciated that in such instances, one wearable device may build the user's physiological information using physiological information stored on the other wearable devices. Alternatively, one wearable device may receive and store all the measured physiological information from the other wearable devices and this may be used to build the user's physiological profile.

FIG. 2C illustrates a yet further alternative embodiment of a method (203) of generating a user's physiological profile. At a first step (212), the computing device (102) transmits a physiological information request for the user to perform an activity or series of activities. At a next step (214), the wearable device (106) receives the physiological information request for the user to perform an activity or series of activities and prompts the user (104) who performs the activity or series of activities. It is appreciated that the activity or series of activities may be monitored by other sensors of the wearable device (106), such as an accelerometer and/or GPS to make sure the activity is followed correctly. At a next step (216), the wearable device (106) measures and transmits (218) the physiological information of the activity or series of activities which is received (220) by the computing device (102) at a subsequent step. It is appreciated that in embodiments where a user is in possession of two or more wearable devices, each wearable device may measure the physiological information of the activity or series of activities and transmit to the computing device. The computing device (102) stores (222) the physiological information of the activity or series of activities in the database (112) and builds (224) the user physiological profile (114) using the stored information in the database (112). For example if the activity is a 10 step walk or run, the user's heart rate or pulse pattern may be measured by the wearable device and the accelerometer and/or GPS may be used to ensure the walk or run is followed correctly.

Figure 3A:
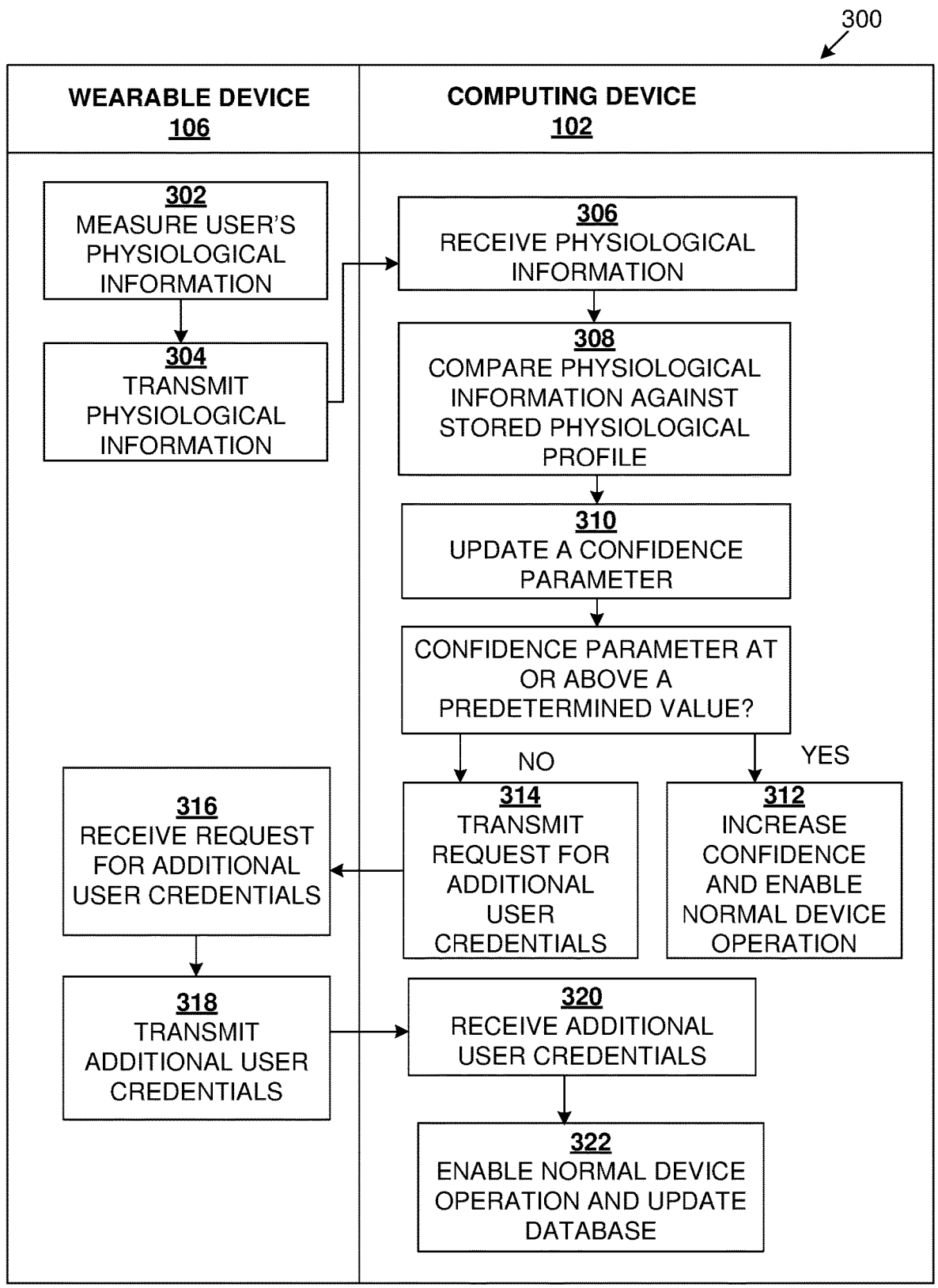
FIG. 3A is a flow diagram illustrating a method of associating a user with a wearable device according to an embodiment of the invention.
Figure 3B:
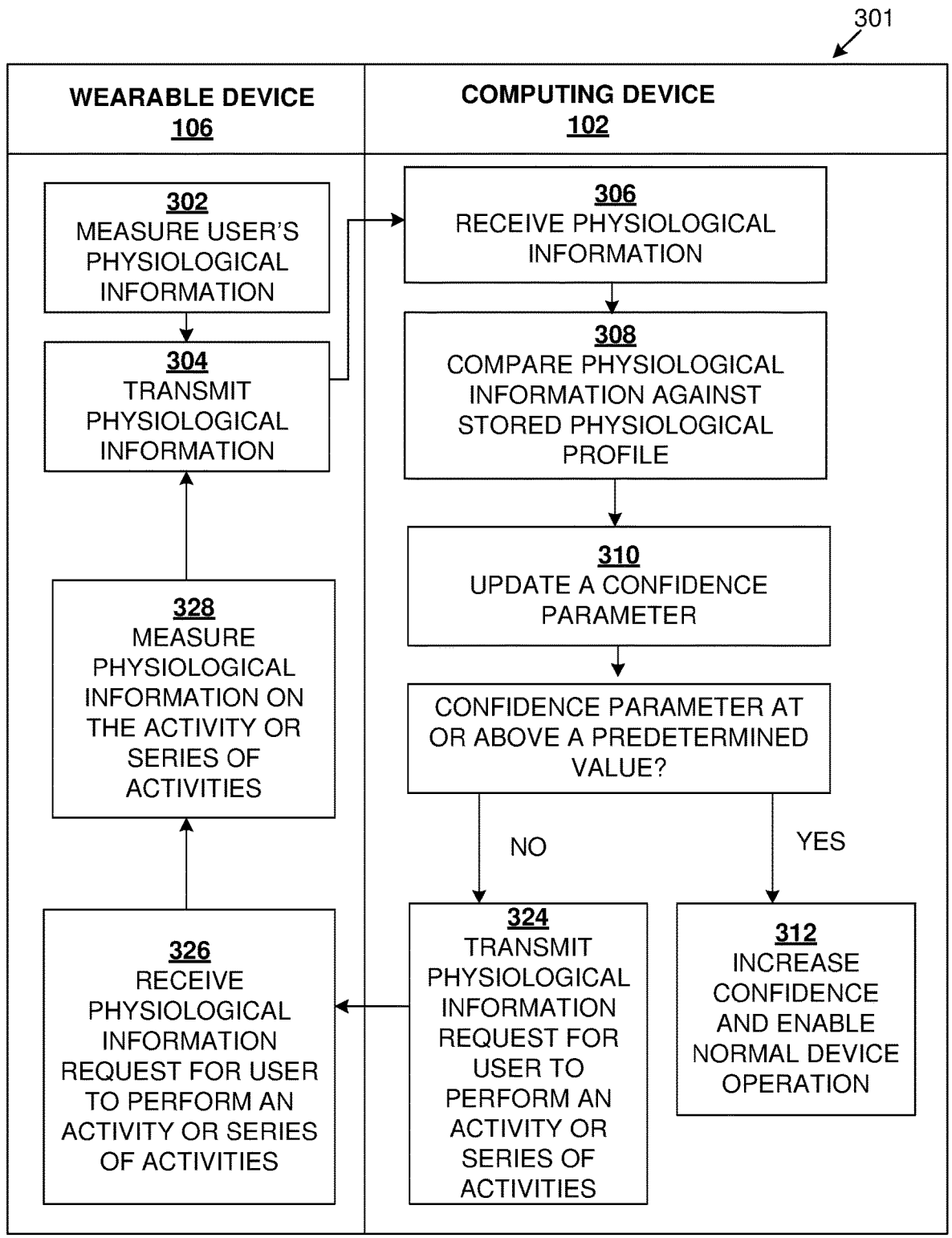
FIG. 3B is a flow diagram illustrating a method of associating a user with a wearable device according to an alternative embodiment of the invention.

The system (100) of FIGS. 1A to 1E may be used according to the methods (300 and 301) described and illustrated in the embodiments of the flow diagrams of FIGS. 3A and 3B respectively.

Referring to FIG. 3A, one embodiment of a computer implemented method (300) of associating a user with a wearable device is described. When a user, for example, takes off the wearable device and later puts it back on, there is a need to identify the user by checking if the device is in fact attached to the rightful user. At a first step (302), the wearable device (106) measures the user's physiological information. At subsequent step (304), the wearable device (106) transmits the measured physiological information and the computing device (102), at a next step (306), receives the transmitted physiological information. The computing device (102), at a next step (308), compares the physiological information against the stored physiological profile (114) and updates the value of a confidence parameter. If the value of the confidence parameter is equal to or above a predetermined value, the computing device (102) will, at a next step (312), increase the value of the confidence parameter, thereby indicating with a high degree of confidence that the wearable device is in fact attached to the rightful user (104) and enable normal device operation. It is appreciated that the confidence parameter may be a measure of the similarity of the measured physiological information when compared with the stored physiological profile so as to indicate the likelihood that the correct user is the authorised user. For example, a 90% similarity may be considered a suitable threshold or predetermined value of the confidence parameter.

Alternatively, if the value of the confidence parameter is below the predetermined value, the computing device (102) will, at a next step (314), transmit a request for additional user credentials which is received, at a next step (316), by the wearable device (106). It is appreciated that the additional user credentials may be a Personal Identification Number (PIN), password, or any suitable personal user information. The wearable device (106) prompts the user (104) who inputs the additional credentials. At a next step (318), the wearable device transmits the additional user credentials to the computing device (102). The computing device, at a next step (320), receives the additional user credentials, and at a next step (322), enables normal device operation and updates the database (112) with the new physiological information (302).

It is appreciated that, in embodiments where the wearable device is a stand-alone device with a processor and an operating system, the method of associating a user with a wearable device as described with reference to FIG. 3A may be carried out at on the wearable device.

FIG. 3B illustrates an alternative embodiment of a computer implemented method (301) of associating a user with a wearable device. The method (300) comprises essentially the same steps as described in FIG. 3A, the steps of measuring (302) and transmitting (304) physiological information of the user (104), by the wearable device (106), receiving (306) and comparing (308) the measured physiological profile information against the stored physiological profile (114) by the computing device (102), and updating (310) a confidence parameter. If the value of the confidence parameter is equal to or above a predetermined value, the computing device (102) increases (312) the value of the confidence parameter and enables normal device operation. However, this embodiment differs in that, if the value of the confidence parameter is below the predetermined value, the computing device (102), at a step (324), transmits a request for additional user credentials which, in this embodiment, is a physiological information request for the user to perform an activity or series of activities.

At a next step (326), the wearable device (106) receives the physiological information request and prompts the user (104) who performs the requested activity or series of activities. It is appreciated that the activity or series of activities may be monitored by other sensors of the wearable device (106), such as an accelerometer and/or GPS to make sure the activity is followed correctly for accurate comparison. At a subsequent step (328), the wearable device (106) measures the physiological information of the activity or series of activities and transmits the information to the computing device (102). The cycle is repeated in order to identify the user.

Figure 4:
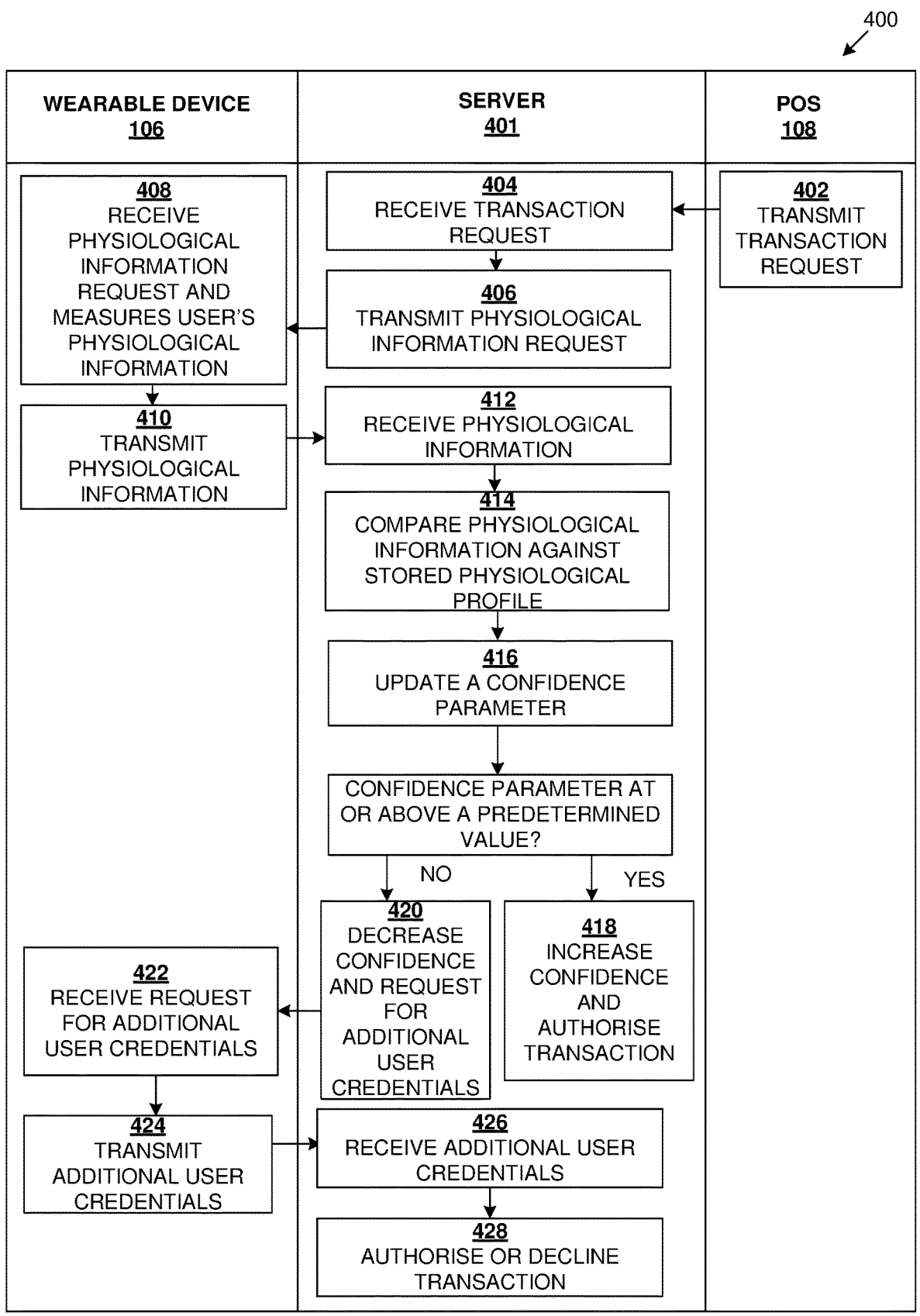
FIG. 4 is a flow diagram illustrating a method of authenticating a user of a transaction according to an embodiment of the invention.

An embodiment of a method (400) of identifying and authenticating a user of a transaction will now be described with reference to the flow diagram of FIG. 4.

When a user (104) purchases goods from a merchant (110), at a first step (402), a POS (108) of the merchant may transmit a transaction request, in this embodiment a payment request, which includes credentials of the user (104) to a server (401). At a next step (404), the server (401) receives the transaction request and subsequently, at a next step (406), transmits a physiological information request to a wearable possession of the user (104) in this embodiment a wearable device (106).

At a next step (408), the wearable device (106) receives the physiological information request and measures the user's physiological information and, at a next step (410), transmits the physiological information to the server (401). It is appreciated that the wearable device may continuously measure the user's physiological information and in such a case, the wearable device (106) may merely transmit the pre-measured physiological information to the server (401) upon request thereof. Furthermore, and as described above, in the event that the wearable device is not capable of communicating with the server directly, it may utilize other communication means, such as a local wireless network, the communication capabilities of a mobile phone, or a second wearable possession of the user having communication capabilities to enable communication with the server (401).

At a next step (412), the server (401) receives the physiological information from the wearable device (106), compares it, at a next step (414), against a stored physiological profile and, at a next step (416), updates a confidence parameter. It is appreciated that steps 406, 412, 414 and 416 may alternatively be carried out at a computing device (102) associated with the wearable device (106). For example, the physiological profile may be stored and checked at the computing device (102) linked to the wearable device (106) as an intermediary and the confidence parameter transmitted to the server (401). Further, it should be noted that in embodiments where the wearable device is a stand-alone device and is worn by the user for an uninterrupted period of time, the server (401) may transmit a confidence parameter request instead of a physiological information request.

If the value of the confidence parameter is equal to or above a predetermined value, the server (401) will, at a subsequent step (418), increase the value of the confidence parameter, thereby indicating with a high degree of confidence that it is in fact the rightful user (104) performing the transaction and that the payment request may therefore be authorized.

On the other hand, if the confidence parameter is below the predetermined value, the server (401) will, at a next step (420), decrease the value of the confidence parameter and transmits a request for additional user credentials. As mentioned in the description above, it is appreciated that the additional user credentials may be a PIN, password, any suitable personal user information, or the physiological information of the user while the user is performing an activity or series of activities. The wearable device (106), at a subsequent step (422), receives the request for additional user credentials and prompts the user (104) to input these credentials. At a next step (424), subsequent to the user inputting the requested additional credentials, the wearable device (106) transmits the additional user credentials to the server (401). The server (401), at a next step (426), receives the additional user credentials and if the user is identified, the transaction will be authorized (428), whereas if the user is not verified, the transaction will be declined.

In embodiments where the request for additional user credentials is a request for physiological information while the user is performing an activity or series of activities, it is appreciated that the user's physiological information of the activity or series of activities immediately prior to the transaction may be used. Further, it is appreciated that the user's current physiological information could be measured and compared with a physiological profile of an activity or series of activities performed by the user immediately prior to the transaction.

Therefore, rather than the server transmitting a request for the user to perform an activity or series of activities, the server may request, or retrieve the user's physiological information obtained immediately prior to the POS transmitting a transaction request. Alternatively, the user's current physiological information may be obtained and compared against a physiological profile of an activity or series of activities performed by the user immediately prior to the POS transmitting a transaction request.

It is appreciated that a physiological profile of an activity or series of activities may have been built using physiological information in combination with other parameters measured by other sensors of the wearable device which may record a user's activity such as accelerometer and/or GPS sensors and/or which may record environmental information such as the surrounding temperature, altitude, location, etc. Other parameters may include the time of day, the location of the user and the altitude of the user. The physiological profile may be a correlation of the following: an activity or series of activities performed by the user, the user's physiological information, and environmental information such as the time of day, location, surrounding temperature, or altitude of the user.

In an exemplary embodiment, suppose it is a hot temperature day and a user is walking outside for a few minutes prior to performing a transaction and, suppose the wearable device continuously measures the user's physiological information, for example the user's body temperature and heart rate, the server may request the user's body temperature and heart rate prior to the transaction as an additional user credential. The accelerometer and/or GPS sensors of the wearable device together with the physiological sensors may have already determined and monitored the user's walking activity prior to the user performing the transaction and built a walking physiological activity profile of the user. The walking physiological activity profile of the user may be a profile having a correlation of the user's walking activity, body temperature for a corresponding ambient temperature, heart rate, time of day, location and/or altitude of the user. The requested body temperature and heart rate may now be compared with the walking physiological activity profile and this may be used to authorise or decline the transaction.

In a further exemplary embodiment, suppose it is a cold winter day and a user is walking outside for a few minutes prior to performing a transaction and, suppose the wearable device continuously measures the user's physiological information, for example the user's body temperature and heart rate. The user's current physiological information may be measured at the time of the transaction and may be used to authorise or decline the transaction. As mentioned in the exemplary embodiment above, the accelerometer and/or GPS sensors of the wearable device together with the physiological sensors may have already determined and monitored the user's walking activity prior to the user performing the transaction and built a walking physiological activity profile of the user. The walking physiological activity profile of the user may be a profile having a correlation of the user's walking activity, body temperature for a corresponding ambient temperature, heart rate, time of day, location and/or altitude of the user. The similarity of the measured physiological information, for example the user's body temperature, in combination with environmental conditions (i.e. cold winter day) may be compared against the user's walking physiological activity profile under these conditions to authorise or decline the transaction.

It should be noted that the user's physiological information (i.e. body temperature and heart rate) described in the exemplary embodiments above may be different in different environmental conditions, for example a cold winter day versus a warm summer day and may be different should the user be stationary, running or performing some other activity.

Figure 5:
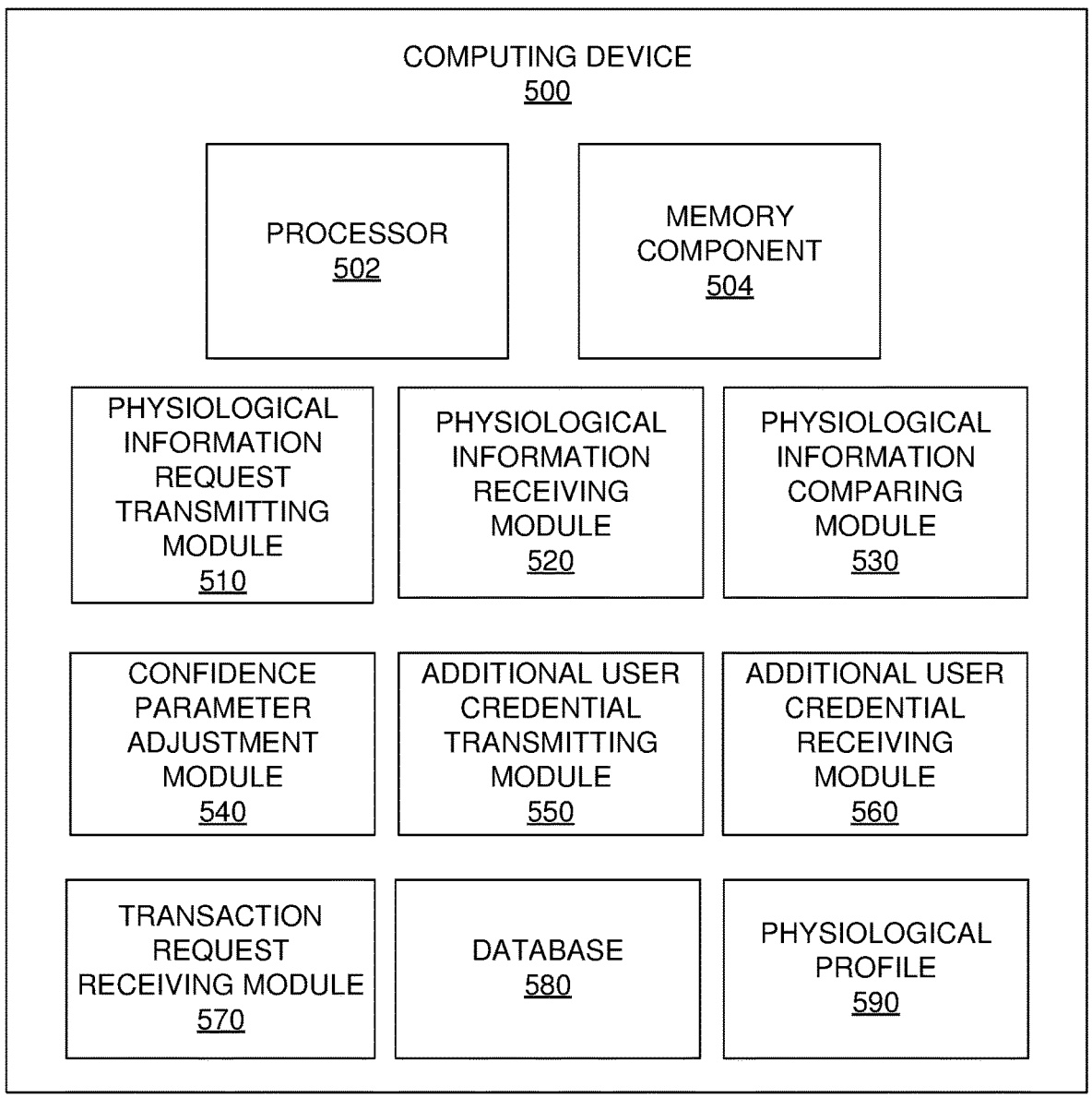
FIG. 5 is a block diagram which illustrates an example of a computing device that may be used in embodiments of the disclosure.

FIG. 5 illustrates an example of a computing device (500) as used in the described system. As mentioned in the description above, it is appreciated that any computing device with processing capabilities and communicating means could be used for example a smart phone, a tablet, a personal digital assistant, a phablet, a laptop computer, a desktop computer or a server. The computing device (500) may include a processor (502) for executing the functions of modules described below, which may be provided by hardware or by software units executing on the computing device (500). The software units may be stored in a memory component (504) and instructions may be provided to the processor (502) to carry out the functionality of the described components. In some cases, for example in a cloud computing implementation, software units arranged to manage and/or process data on behalf of the computing device (500) may be provided remotely. Some or all of the components may be provided by a software application downloadable onto and executable on the computing device (500).

The computing device (500) may include a physiological information request transmitting module (510), physiological information receiving module (520), physiological information comparing module (530) and a confidence parameter adjustment module (540). The computing device (500) may further include an additional user credential transmitting module (550), an additional user credential receiving module (560), a transaction request receiving module (570), a database (580) and a physiological profile (590).

The physiological information request transmitting module (510) may be used to transmit physiological information request to a user's wearable device. For example, in the embodiment described with reference to FIG. 2C, the physiological information request transmitting module (510) is used to transmit physiological information request for the user to perform an activity or series of activities.

The physiological information receiving module (520) may be used to receive physiological information from the wearable device. Therefore, in the embodiment described above, the physiological information receiving module (520) is used to receive physiological information transmitted by the wearable device.

The physiological information comparing module (530) may be used to compare physiological information with a physiological profile of the user. For example, in the embodiment described with reference to any one of FIGS. 3A, 3B and FIG. 4, the physiological information comparing module (530) is used to compare the measured physiological information against stored physiological profile of the user.

The confidence parameter adjustment module (540) may be used to adjust the value of the confidence parameter in response to the comparison of the measured physiological information against stored physiological profile of the user. Therefore, in the embodiment described above, if the confidence parameter adjustment module (540) determines that the value of confidence parameter is equal to or above a predetermined value, the computing device (500) will increase the value of the confidence parameter, thereby indicating with a high degree of confidence that the wearable device is in fact attached to the rightful user. On the other hand, if the confidence parameter adjustment module (540) determines that the value of the confidence parameter is below the predetermined value, the computing device (500) will decrease the value of the confidence parameter and request further information such as physiological information requests for user to perform an activity or series of activities as illustrated in the embodiment of FIG. 3B.

The additional user credential transmitting module (550) may be used to transmit requests for additional user credential. For example, in the embodiment described with reference to FIG. 3A, the additional user credential transmitting module (550) is used to transmit requests for additional user credentials in the situation where the value of the confidence parameter is below a predetermined value.

The additional user credential receiving module (560) may be used to receive additional user credentials. For example, in the embodiment described with reference to FIG. 3A, the additional user credential receiving module (560) is used to receive additional user credentials from the wearable device.

In a preferred embodiment and as illustrated in FIG. 5, the computing device (500) further includes a transaction request receiving module (570) which may be used to receive transaction requests, which include credentials of users. For example, in the embodiment described with reference to FIG. 5, the transaction request receiving module (570) is used to receive a payment request from the merchant or its financial institution wherein the payment request includes payment credentials of the user.

The computing device (500) further includes a database (580) and a physiological profile (590) built from the database. For example, in the embodiment described with reference to any one of FIGS. 2A and 2B, the database (580) is updated from measured physiological information from the wearable device and the physiological profile (590) is built from the information stored on the database.

Figure 6:
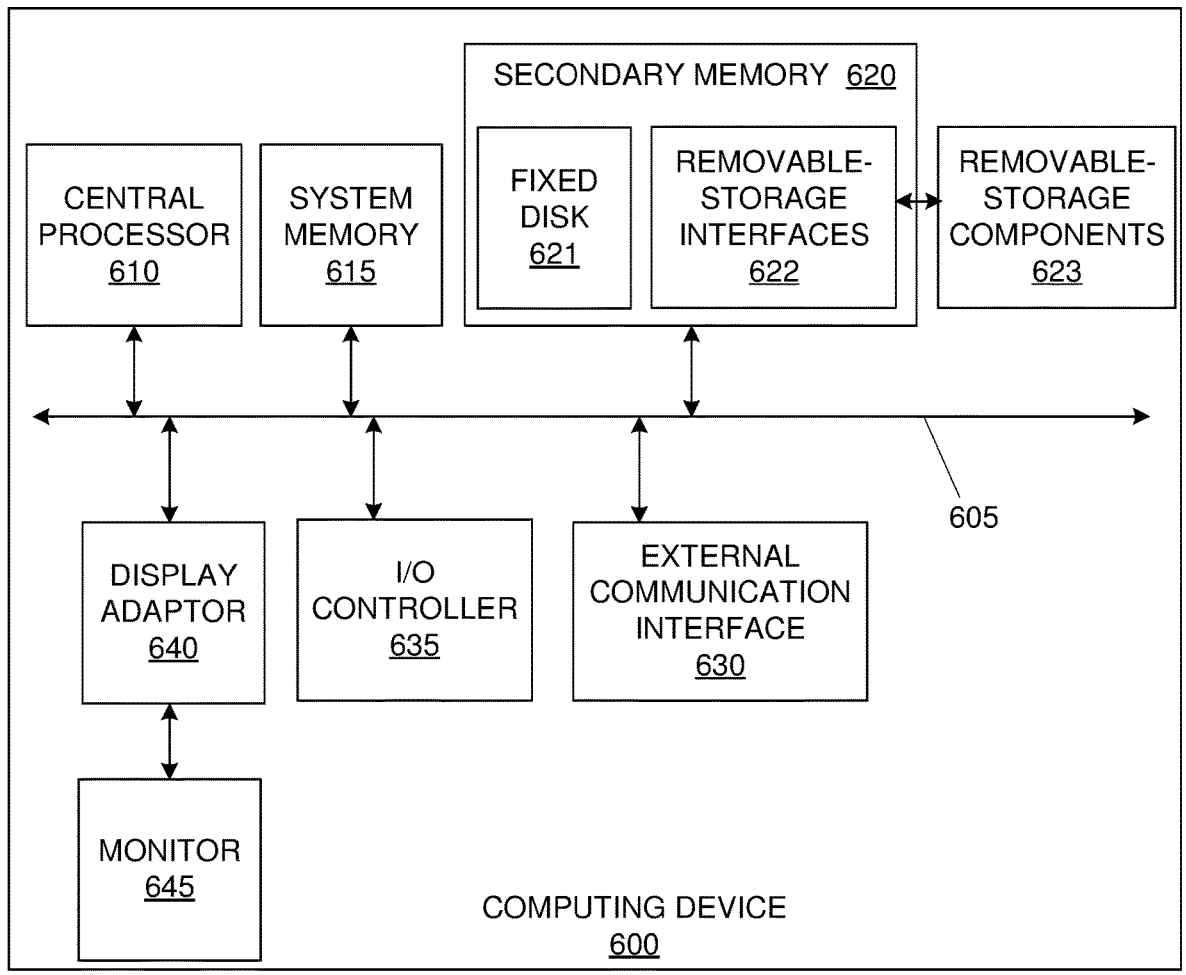
FIG. 6 illustrates an example of a computing device in which various aspects of the disclosure may be implemented.

FIG. 6 illustrates an example of a computing device (600) in which various aspects of the disclosure may be implemented. The computing device (600) may be suitable for storing and executing computer program code. The various participants and elements in the previously described system diagrams, for example the wearable device and the server in the embodiment described with reference to FIG. 4 may use any suitable number of subsystems or components of the computing device (600) to facilitate the functions described herein.

The computing device (600) may include subsystems or components interconnected via a communication infrastructure (605) (for example, a communications bus, a cross-over bar device, or a network). The computing device (600) may include at least one central processor (610) and at least one memory component in the form of computer-readable media. In some configurations, a number of processors may be provided and may be arranged to carry out calculations simultaneously. In some implementations, a number of computing devices (600) may be provided in a distributed, cluster or cloud-based computing configuration and may provide software units arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software.

The memory components may also include secondary memory (620). The secondary memory (620) may include a fixed disk (621), such as a hard disk drive, and, optionally, one or more removable-storage interfaces (622) for removable-storage components (623).

The removable-storage interfaces (622) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (622) may also be in the form of ports or sockets for interfacing with other forms of removable-storage components (623) such as a flash memory drive, external hard drive, or removable memory chip, etc.

The computing device (600) may include an external communications interface (630) for operation of the computing device (600) in a networked environment enabling transfer of data between multiple computing devices (600). Data transferred via the external communications interface (630) may be in the form of signals, which may be electronic, electromagnetic, optical, radio, or other types of signal.

The external communications interface (630) may enable communication of data between the computing device (600) and other computing devices including servers and external storage facilities. Web services may be accessible by the computing device (600) via the communications interface (630).

The external communications interface (630) may also enable other forms of communication to and from the computing device (600) including, voice communication, near field communication, Bluetooth®™, etc.

The computer-readable media in the form of the various memory components may provide storage of computer-executable instructions, data structures, program modules, and other data. A computer program product may be provided by a computer-readable medium having stored computer-readable program code executable by the central processor (610).

A computer program product may be provided by a non-transient computer-readable medium, or may be provided via a signal or other transient means via the communications interface (630).

Interconnection via the communication infrastructure (605) allows a central processor (610) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (600) either directly or via an I/O controller (635). These components may be connected to the computing device (600) by any number of means known in the art, such as a serial port.

One or more monitors (645) may be coupled via a display or video adapter (640) to the computing device (600).

Figure 7:
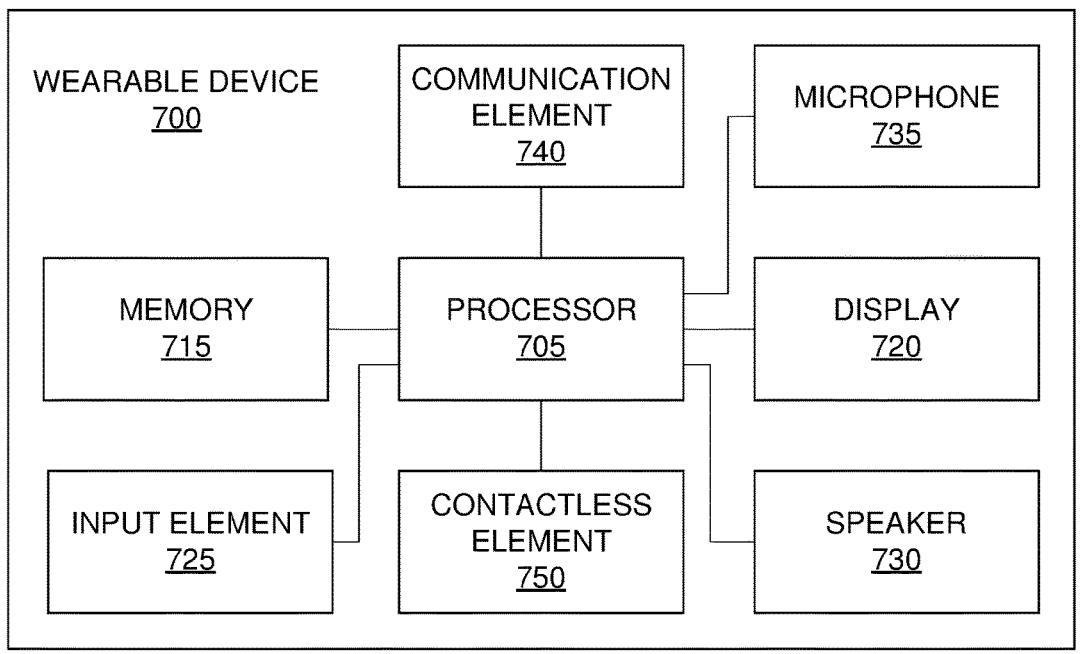
FIG. 7 shows a block diagram of a wearable device that may be used in embodiments of the disclosure.

FIG. 7 shows a block diagram of a wearable device (700) that may be used in embodiments of the disclosure. The wearable device (700) may be a smart watch, a smart glove, a smart shirt, a wristband or smart glasses.

The wearable device (700) may include a processor (705) (e.g., a microprocessor) for processing the functions of the wearable device (700) and a display (720) to allow a user to see information and messages. The wearable device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the wearable device (700).

The processor (705) of the wearable device (700) may connect to a memory (715). The memory (715) may be in the form of a computer-readable medium that stores data and, optionally, computer-executable instructions.

The wearable device (700) may also include a communication element (740) for connection to communication channels (e.g., a cellular telephone network, data transmission network, Wi-Fi® network, satellite-phone network, Internet network, Satellite Internet Network, etc.). The communication element (740) may include an associated wireless transfer element, such as an antenna.

The communication element (740) may include a subscriber identity module (SIM) in the form of an integrated circuit that stores an international mobile subscriber identity and the related key used to identify and authenticate a subscriber using the wearable device (700). One or more subscriber identity modules may be removable from the wearable device (700) or embedded in the wearable device (700).

The wearable device (700) may further include a contactless element (750), which is typically implemented in the form of a semiconductor chip (or other data storage element) with an associated wireless transfer element, such as an antenna. The contactless element (750) may be associated with (e.g., embedded within) the wearable device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750).

The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth®, infra-red, or other data transfer capability that can be used to exchange data between the wearable device (700) and an interrogation device. Thus, the wearable device (700) may be capable of communicating and transferring data and/or control instructions via both a cellular network and near field communications capability.

The data stored in the memory (715) may include: operation data relating to the operation of the wearable device (700), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the wearable device (700) to selected receivers.

The wearable device (700) may be, amongst other things, a notification device that can receive alert messages and access reports, a portable merchant device that can be used to transmit control data identifying a discount to be applied, as well as a portable consumer device that can be used to make payments.

Figure 8A:
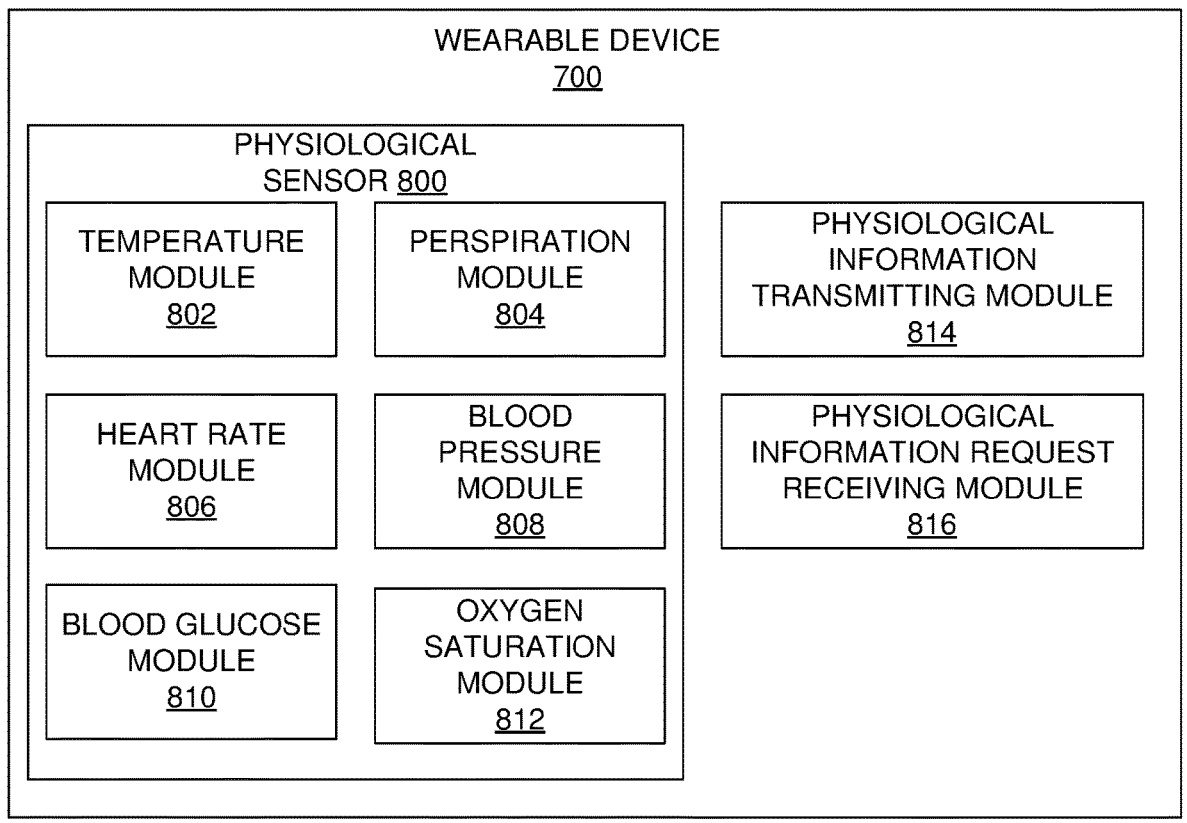
FIG. 8A shows a block diagram of additional components of a wearable device that may be used in embodiments of the disclosure; and, FIG. 8B shows a block diagram of additional components of a wearable device that may be used in an alternative embodiment of the disclosure.
Figure 8B:
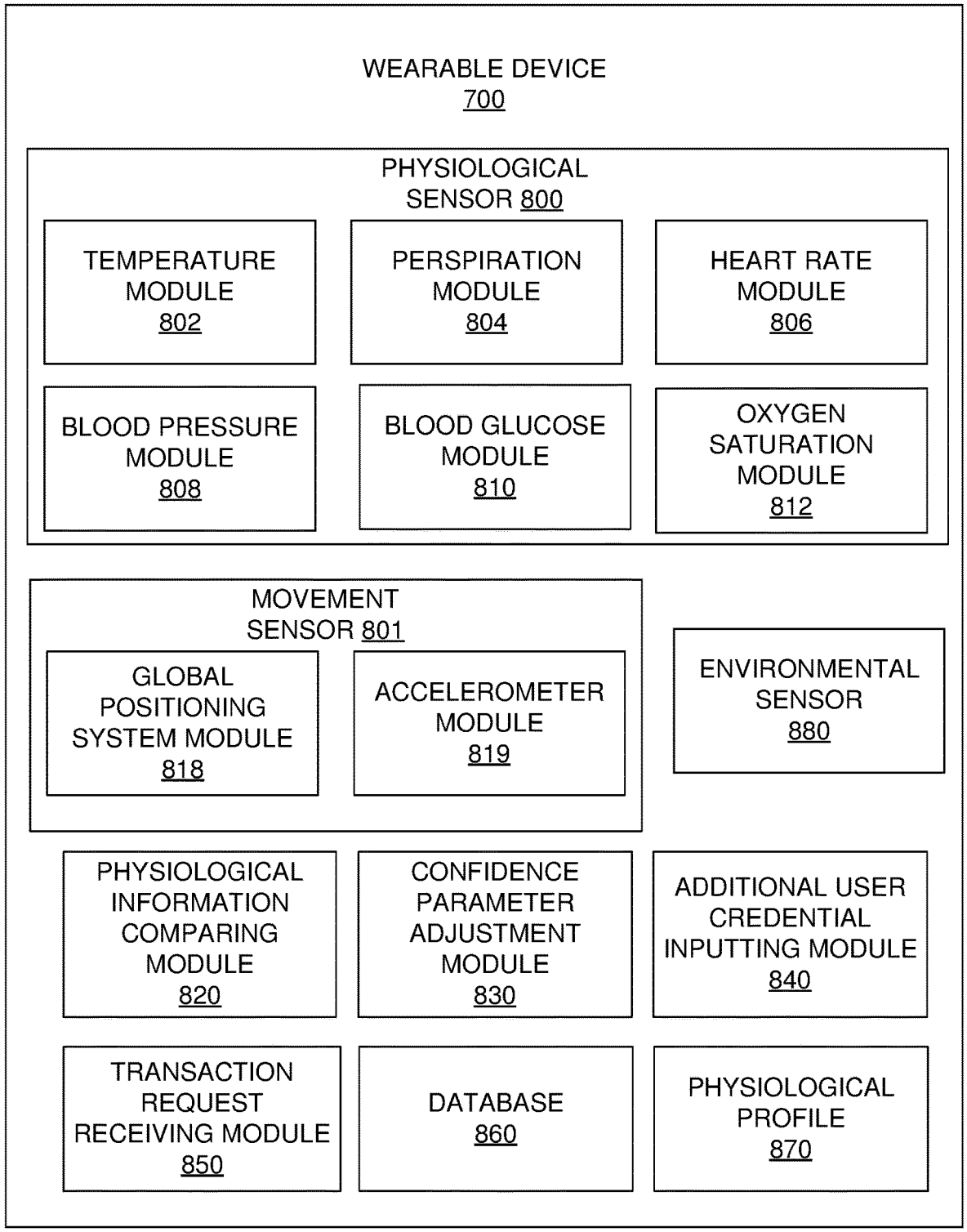

Additional components of the wearable device (700) are illustrated in the embodiments of the block diagrams of FIGS. 8A and 8B.

FIG. 8A shows a block diagram of additional components of the wearable device (700) as used in the described system wherein the wearable device (700) is in communication with a computing device. The wearable device (700) includes a physiological sensor (800), a physiological information transmitting module (814) and a physiological information request receiving module (816).

The physiological sensor (802) may be used to measure the user's physiological information and may comprise a temperature module (802), a perspiration module (804), a heart rate module (806), a blood pressure module (808), a blood glucose module (810) and/or an oxygen saturation module (812).

The temperature module (802) may be used to measure the user's body or skin temperature, the perspiration module (804) may be used to measure the user's sweat pattern or perspiration rate, the heart rate module (806) may be used to measure the user's pulse pattern or heart rate, the blood pressure module (808) may be used to measure the user's systolic and diastolic blood pressure, the blood glucose module (810) may be used to measure the amount of glucose in the user's blood and the oxygen saturation module (812) may be used to measure the amount of oxygen that is being carried in the user's blood. For example in the embodiments described with reference to FIG. 2A, the physiological sensor (802) is used to continuously measure the user's physiological information which could be the user's body or skin temperature, sweat pattern, pulse, blood pressure, blood glucose, or the amount of oxygen carried by the user's blood.

The physiological information transmitting module (814) may be used to transmit physiological information to the computing device. For example, in the embodiment described with reference to FIG. 2C, the physiological information transmitting module (814) is used to transmit physiological information to the computing device after the user has perform an activity or series of activities.

The physiological information request receiving module (816) may be used to receive physiological information requests from the computing device. Therefore, in the embodiment described in FIG. 2C, the physiological information receiving module (816) is used to receive physiological information requests transmitted by the computing device.

FIG. 8B shows a block diagram of additional components of the wearable device (700) used in an alternative embodiment, wherein all the processes involved in the computing device are done at the wearable device (700). The wearable device (700) includes a physiological sensor (800), a movement sensor (801), an environmental sensor (880), a physiological information comparing module (820), a confidence parameter adjustment module (830), and additional user credential inputting module (840). The wearable device (700) may further include a transaction request receiving module (850), a database (860) and a physiological profile (870).

The physiological sensor (800) may be used to measure the user's physiological information as described above with reference to FIG. 8A. For example in the embodiments described with reference to FIG. 2B, the physiological sensor (800) is used to continuously measure the user's physiological information.

The movement sensor (801) may be used in association with the physiological sensor (800) in embodiments where the wearable device (700) monitors activities or sets of activities performed by the user. The movement sensor may include GPS (818) and accelerometer (819) modules which may act together to make sure the activity or set of activities is followed correctly for accurate comparison.

The environmental sensor (880) may be used in association with the physiological sensor (800) to record or access environmental information at the time and place of the measurement of the physiological information. The environmental information may be provided in conjunction with the physiological information for recording and referencing in the physiological profile (870).

The physiological information comparing module (820) may be used to compare physiological information with a physiological profile of the user. For example, in the instance where the user is to be identified prior to a transaction being authorised, the physiological information comparing module (820) is used to compare the measured physiological information against stored physiological profile of the user.

The confidence parameter adjustment module (830) may be used to adjust the value of the confidence parameter in response to the comparison of the measured physiological information against stored physiological profile of the user. Therefore, in the embodiment described above, if the confidence parameter adjustment module (830) determines that the value of the confidence parameter is equal to or above a predetermined value, the wearable device (700) will increase the value of the confidence, thereby indicating with a high degree of confidence that it is in fact attached to the rightful user. On the other hand, if the confidence parameter adjustment module (830) determines that the value of the confidence parameter is below the predetermined value, the wearable device (700) will decrease the value of the confidence parameter and optionally stop working or request for additional user credentials.

The additional user credential inputting module (840) may be used to requests for additional user credentials. For example, in the instance wherein the user is to be identified prior to a transaction being authorised, and wherein the value of the confidence parameter is below the predetermined value, the additional user credential inputting module (840) is used to requests for additional user credentials to be made.

The transaction request receiving module (850) may be used to receive transaction requests from a POS device in a retail store of a merchant or from a server handling a transaction request. For example is the user wishes to make payment at a retail store using the wearable device (700), the transaction request receiving module (850) is used to receive a payment request from the merchant or its financial institution wherein the payment request includes payment credentials of the user.

The wearable device (700) may further include or have access to a database (860) and a physiological profile (870) built from the database. For example, in the embodiment described with reference to FIG. 2A, the database (860) is updated from measured physiological information and the physiological profile (870) is built therewith.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer implemented method for associating a user with a wearable device, the method comprising:
    obtaining, by a computing device, first physiological information of the user of the wearable device from the wearable device, wherein the first physiological information includes a combination of physiological data gathered by the wearable device, the physiological data including a heart rate, sweat pattern, gait, and/or temperature of the user;
    comparing, by the computing device, the obtained first physiological information against a stored physiological profile, wherein the stored physiological profile is built up over time from obtained physiological information;
    based on the comparison, updating, by the computing device, a confidence parameter indicating the extent to which the obtained first physiological information matches the stored physiological profile;
    determining, by the computing device, that the confidence parameter is below a threshold;
    transmitting, by the computing device to the wearable device, a request to the wearable device for second physiological information while the user is performing an instructed activity;
    receiving, by the computing device, a response from the wearable device including the second physiological information of the user during the instructed activity; the second physiological information including physiological data including a heart rate, sweat pattern, gait, and/or temperature of the user obtained while the user is performing the instructed activity;
    verifying, by the computing device, the user based on the second physiological information of the user during the instructed activity; and
    approving or denying a financial transaction based on whether or not the user is verified.

2. The computer implemented method as claimed in claim 1, wherein the stored physiological profile is based on one or more measurable physiological parameters, which are obtainable on a periodic or continuous basis and used to build the stored physiological profile.

3. The computer implemented method as claimed in claim 1, including obtaining activity information and/or environmental information at the time of obtaining physiological information, and wherein the stored physiological profile is referenced with one or more activity parameters and/or one or more environmental parameters from the obtained activity information and/or environmental information.

4. The computer implemented method as claimed in claim 1, wherein the method is carried out at the time of a transaction request of the user of the wearable device.

5. The computer implemented method as claimed in claim 1, wherein if the confidence parameter is below a second threshold, declining the financial transaction.

6. The computer implemented method as claimed in claim 1, including monitoring movement of the wearable device during the instructed activity to ensure the instructed activity is carried out.

7. The computer implemented method as claimed in claim 1, wherein if the confidence parameter is below a third threshold, blocking operation of the wearable device.

8. The computer implemented method as claimed in claim 1, wherein the computing device is a smart phone in communication with the wearable device.

9. The computer implemented method as claimed in claim 1, wherein obtaining the first physiological information of the user of the wearable device further includes obtaining third physiological information from a second wearable device of the user.

10. A system including a memory for storing computer-readable program code and a processor for executing the computer-readable program code to implement a method comprising:
    obtaining first physiological information of a user of a wearable device from the wearable device, wherein the first physiological information includes a combination of physiological data gathered by the wearable device, the physiological data including a heart rate, sweat pattern, gait, and/or temperature of the user;
    comparing the obtained first physiological information against a stored physiological profile, wherein the stored physiological profile is built up over time from obtained physiological information;
    based on the comparison, updating a confidence parameter indicating the extent to which the obtained first physiological information matches the stored physiological profile;
    determining that the confidence parameter is below a threshold;
    transmitting, to the wearable device, a request to the wearable device for second physiological information while the user is performing an instructed activity;
    receiving a response from the wearable device including the second physiological information of the user during the instructed activity; the second physiological information including physiological data including a heart rate, sweat pattern, gait, and/or temperature of the user obtained while the user is performing the instructed activity;
    verifying the user based on the second physiological information of the user during the instructed activity; and
    approving or denying a financial transaction based on whether or not the user is verified.

11. The system of claim 10, wherein obtaining the first physiological information of the user of the wearable device further includes obtaining third physiological information from a second wearable device of the user.

12. The system of claim 10, wherein the method further includes monitoring movement of the wearable device during the instructed activity to ensure the instructed activity is carried out.

* * * * *